United States Patent [19]

Renzulli et al.

[11] 4,153,831
[45] May 8, 1979

[54] PLASMA ARC WELDER FOR TITANIUM BLADE SPARS

[75] Inventors: Michael A. Renzulli, Trumbull; Fiorentino G. DelMastro, Monroe, both of Conn.

[73] Assignee: United Technologies Corporation, Hartford, Conn.

[21] Appl. No.: 846,092

[22] Filed: Oct. 27, 1977

[51] Int. Cl.$^2$ .............................................. B23K 9/00
[52] U.S. Cl. ................................ 219/121 P; 219/60 R
[58] Field of Search ............ 219/121 P, 121 EB, 61.7, 219/60 R, 72, 74

[56] References Cited

U.S. PATENT DOCUMENTS

| | | | |
|---|---|---|---|
| 2,644,070 | 6/1953 | Herbst | 219/74 |
| 2,716,691 | 8/1955 | Bowman | 219/60 R |
| 3,437,787 | 4/1969 | Chyle | 219/60 R X |
| 3,535,489 | 10/1970 | Hinrichs | 219/72 X |
| 3,654,818 | 3/1972 | Erlandson | 219/84 X |
| 3,763,342 | 10/1973 | Oppenheimer | 219/61.7 X |

Primary Examiner—J. V. Truhe
Assistant Examiner—Fred E. Bell
Attorney, Agent, or Firm—Vernon F. Hauschild

[57] ABSTRACT

A tube welding mill is shown through which titanium tube preforms are drawn and closed under a relatively stationary plasma arc welding torch. The tube preforms are drawn through a series of closing capstans, over a knife-edge guide bar and eventually under the plasma arc welding torch. The weld area and some distance down stream of the weld is shielded by inert gas containing box-like trailers including an upper trailer supported on the frame of the mill having resilient side walls which embrace the outer surface of the tube and a lower trailer supported on the mandrel within the tube which is carried by the guide bar. The lower trailer is floated on springs which allow it to move bodily in vertical planes parallel with the tube and otherwise adjust itself to maintain its top edges in sealing engagement with the inside wall of the tube beneath the weld.

3 Claims, 12 Drawing Figures

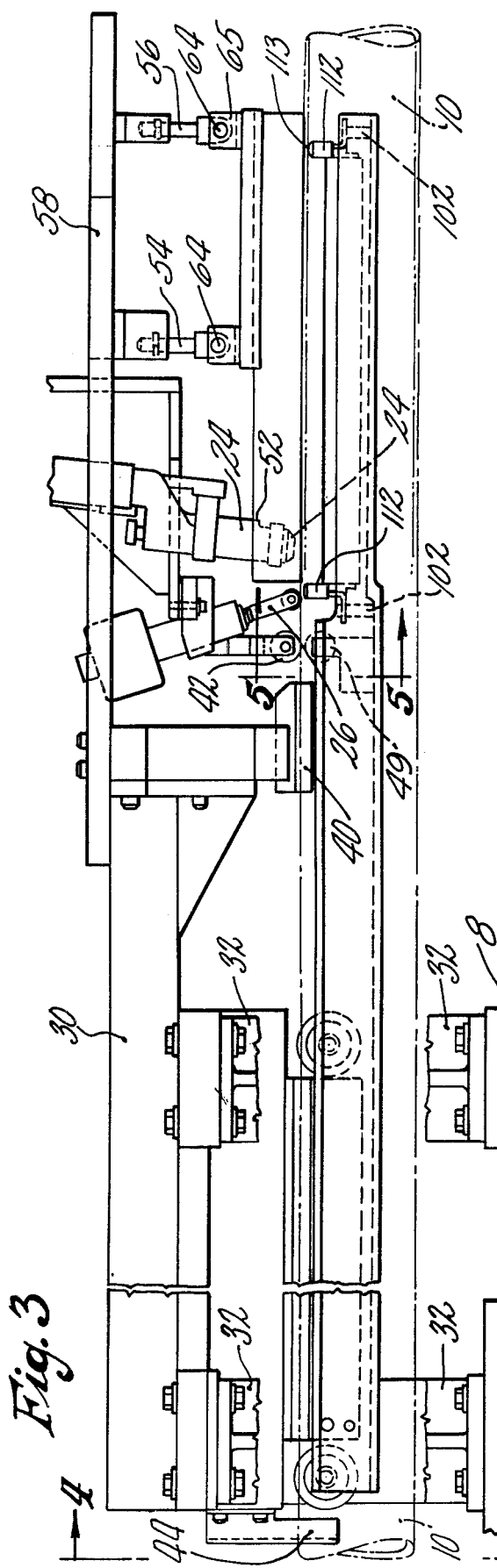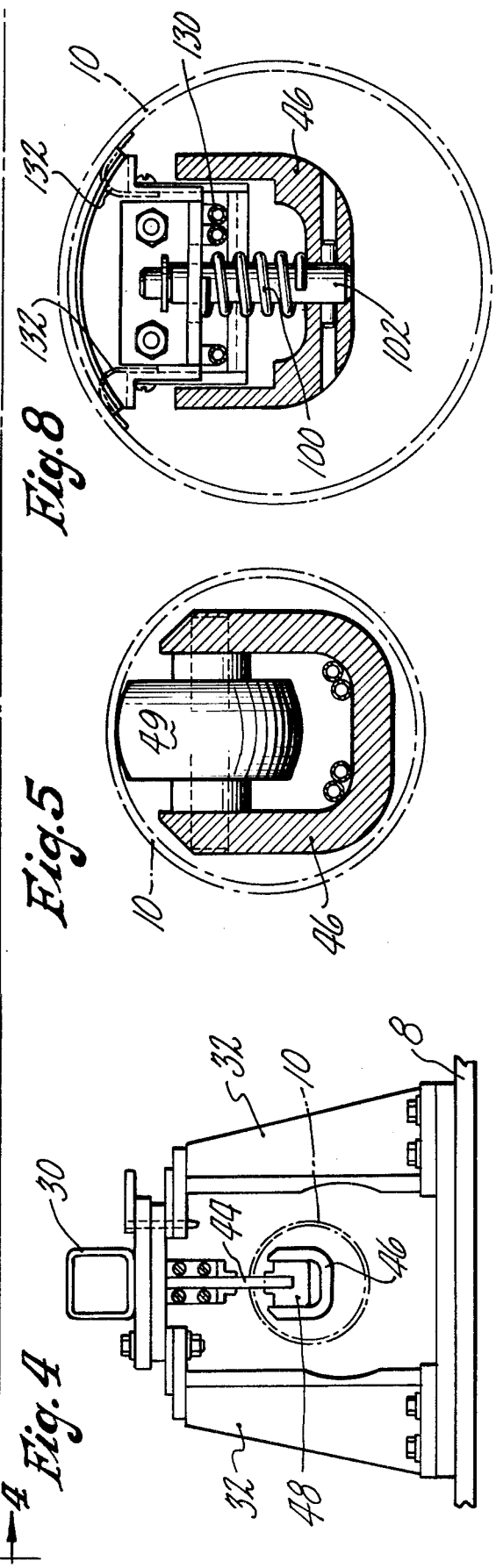

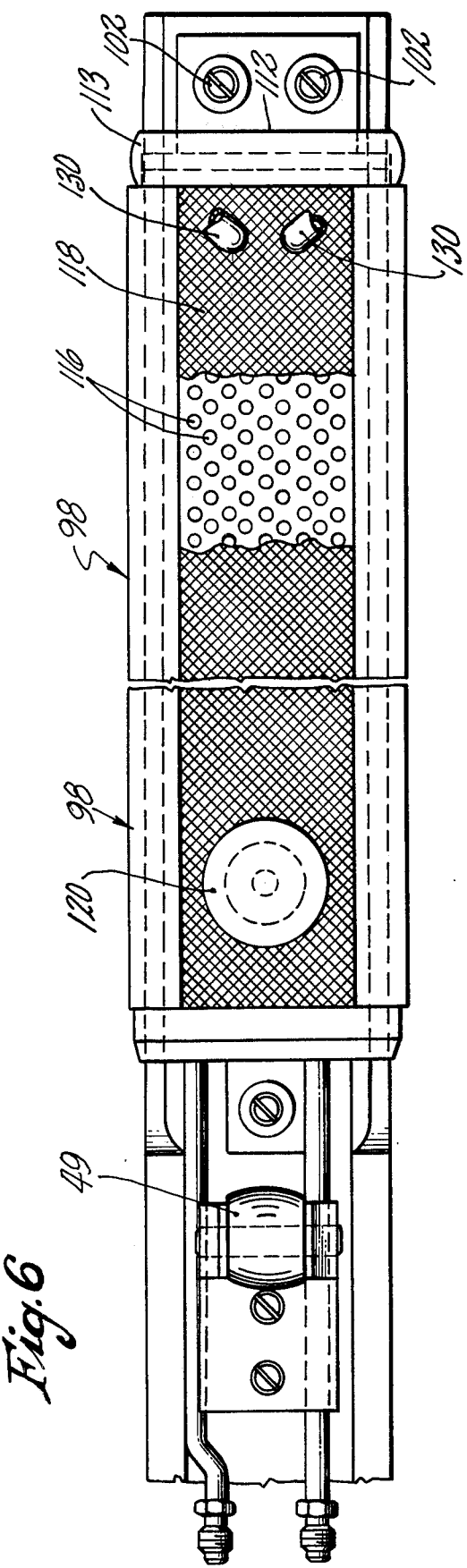
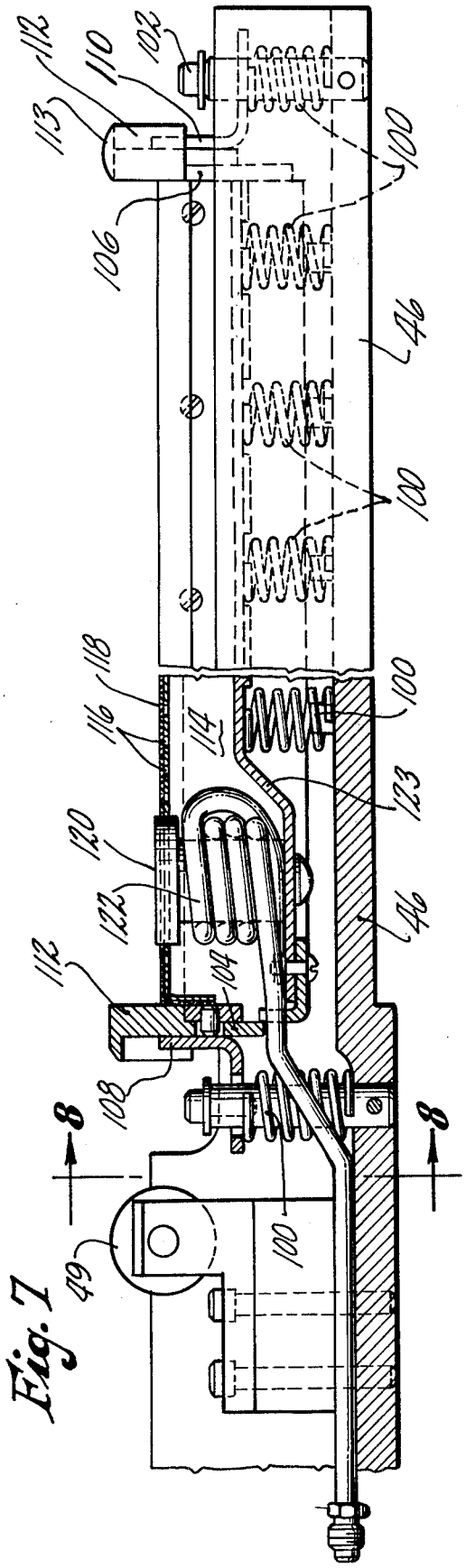

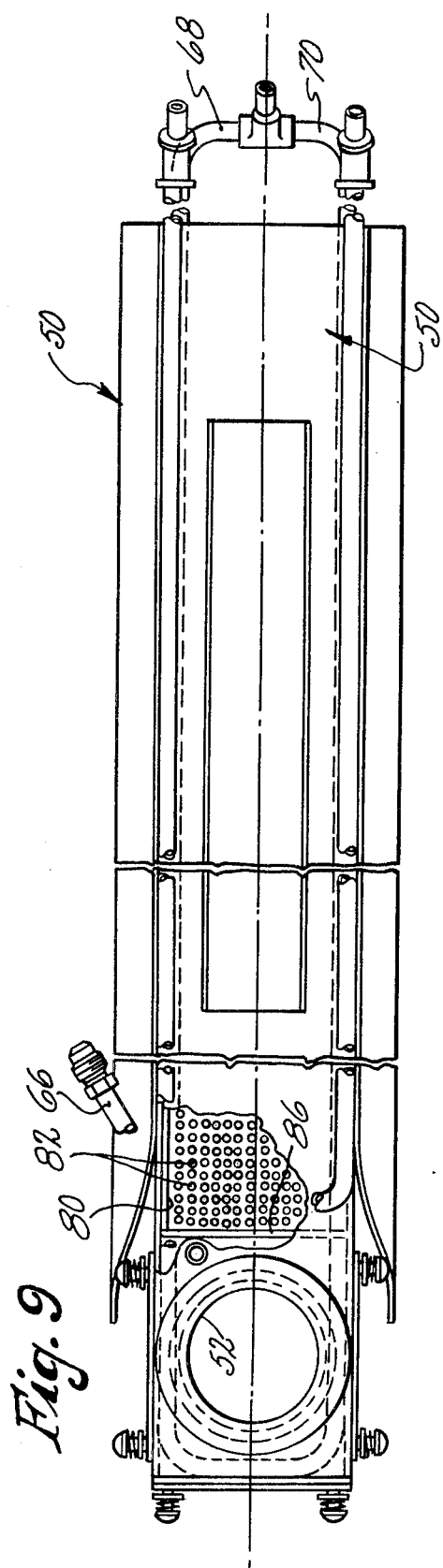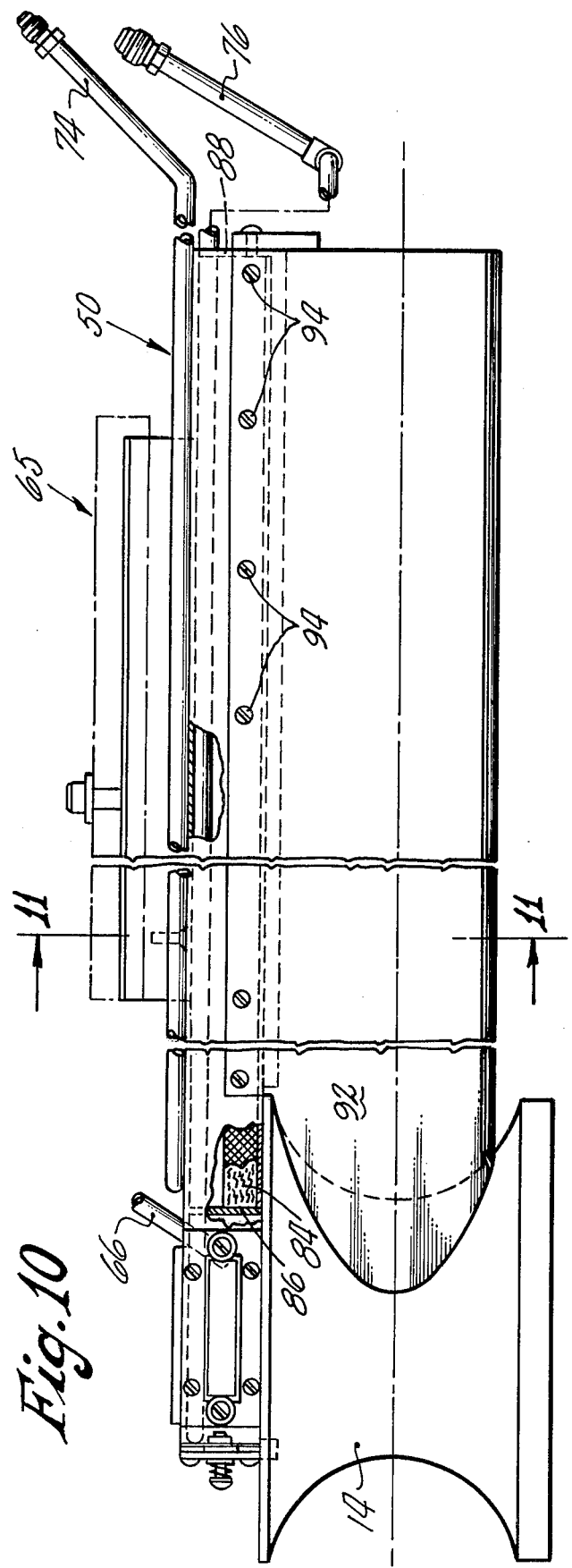
Fig. 9
Fig. 10

PLASMA ARC WELDER FOR TITANIUM BLADE SPARS

BACKGROUND OF THE INVENTION

1. Field of the Invention

This invention relates to plasma arc welding mills in which titanium tube preforms are drawn and closed under a relatively stationary plasma arc welding torch. The preforms are drawn through a series of capstan rollers, past a knife-edge guide bar and under the plasma arc torch where a key-hold butt weld is made along the longitudinal seam. The weld area of the tube and some distance down stream of the weld is shielded by an inert gas, usually argon, confined within an upper box-like trailer carried by the frame of the mill and riding on the outer surface of the tube above the weld and a similar lower trailer supported on a mandrel within the tube which is carried by the guide bar and rides on the inside wall of the tube beneath the weld.

2. Description of the Prior Art

The U.S. Pat. to Paul M. Erlandson No. 3,652,818, issued Mar. 28, 1972 shows an inert atmosphere seam welder for resistance welding of the overlapping edges of can bodies. This patent also shows upper and lower gas confining trailers having flexible edges engaging the outer and inner tubular wall of the can in the vicinity of the welding torch.

SUMMARY OF THE INVENTION

The usefulness of a titanium spar rotor blade was demonstrated through numerous tests and an effective method of manufacturing these spars was established at Sikorsky Aircraft. It was found after numerous programs that cold brake sheet forming and longitudinal plasma arc butt welding was the most feasible and lowest cost method for making these titanium spars using a capstan type forming system for making the longitudinal seam of the tubes. This system is designed to pull a tube preform through a series of closing capstans and over a knife-edge guide bar, past a hold-down roll and finally into the plasma arc welding capstan. Upstream of the welding capstan is an electro-mechanical seam tracker which follows the almost-closed seam and inputs lateral torch movement as required to keep the torch and resulting weld bead directly on the seam.

Gas shielding over the molten weld and downstream of the torch is provided by top and bottom box-like gas containing trailers that ride on the moving tube. The top trailer rides on the outside of the tube shielding the top of the weld bead; the bottom trailer rides on the inside of the tube shielding the bottom of the weld bead. This system is capable of making single pass keyhole welds in titanium which meet the stringent requirements of a main rotor blade spar for helicopters.

The system above described can be used to make longitudinal seam welds on a spar of uniform diameter or on a spar having a taper. If a tapered spar is desired a preform is used which will produce a spar having a uniform inside diameter from root end to tip end, the taper, which in a blade spar 25 feet long might be ½" in diameter from root to tip, results from a reduction in outside diameter. This produces a spar having progressively thinner tube wall from root to tip end, with a consequent reduction in weight toward the tip. Because the base material in a tapered preform changes in thickness due to its non-linear taper as it passes under the welding torch, it is necessary to vary the welding parameters continuously. This is done by varying the weld current automatically as the spar moves past the torch. This mechanism, however, forms no part of the present invention.

It is an object of this invention to provide a capstan type joining system for plasma arc welding of titanium spars for helicopter main rotor blades.

Another object of this invention is to provide improved inert gas shielding of the plasma arc weld in such a system by which satisfactory continuous longitudinal seam welds can be made on titanium preforms.

More specifically it is an object of this invention to improve the gas shielding of the weld both above and below the weld bead at the plasma arc and for a substantial distance beyond the weld.

In making continuous welds of great length, particularly in titanium, great care must be taken to provide a body of oxygen free inert gas, such as argon gas, in the weld zone and downstream of the welding electrode while the weld bead is molten or plastic. This has been done in connection with resistance welding and tungsten arc welding of stainless steel tubes by providing fixed trailers having resilient edges which engage the tube. However these gas trailers have been unsatisfactory even for uniform diameter tubes and very wasteful of expensive argon gas due to excessive leakage. This is particularly true in the case of the bottom trailer. On tapered tubes the prior gas trailers have proved even less satisfactory.

It is a further object of this invention to provide an improved gas trailer and support therefor which provides improved sealing of the upper and bottom trailers on the tube wall.

A still further object of this invention is to provide a bottom gas trailer which is bodily floated on spring supports and is free to move bodily in vertical planes parallel with the longitudinal seam it encloses.

A yet further object of this invention is to provide an improved upper gas trailer which has resilient side walls which encompass the tubular spar and thus constantly urge the trailer against the spar.

These and other objects and advantages of the invention will become evident in connection with the detailed description of the accompanying drawings which illustrate preferred constructions for carrying out the invention.

BRIEF DESCRIPTION OF THE DRAWINGS

FIG. 3 is a side view of the tube mill, parts being broken away to facilitate illustration;

FIG. 4 is a section on line 4—4 of FIG. 3;

FIG. 5 is a section on line 5—5 of FIG. 3;

FIG. 6 is a plan view of the bottom gas trailer, parts being broken away;

FIG. 7 is a side view, partly in section, of FIG. 6;

FIG. 8 is a section on line 8—8 of FIG. 7;

FIG. 9 is a plan view of the upper, or exterior, gas trailer, parts being broken away;

FIG. 10 is a side view of FIG. 9, parts being shown in section;

DESCRIPTION OF THE PREFERRED EMBODIMENT

Figure 1:
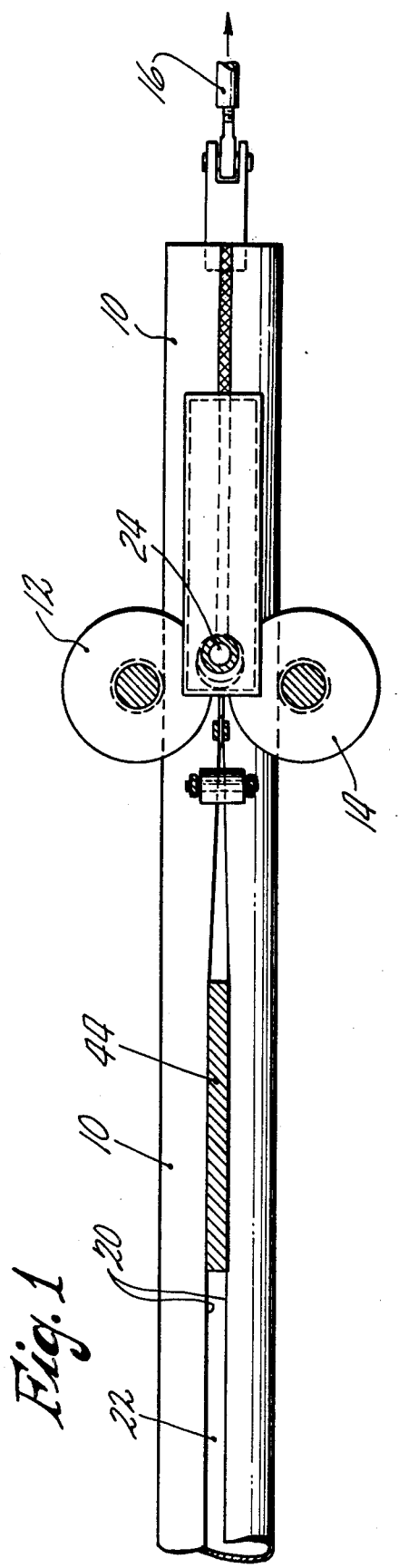
FIG. 1 is a detail of the tube welding mill of this invention shown in plan view with a tube preform in the mill, the view being taken in the vicinity of the welding capstan.
Figure 2:
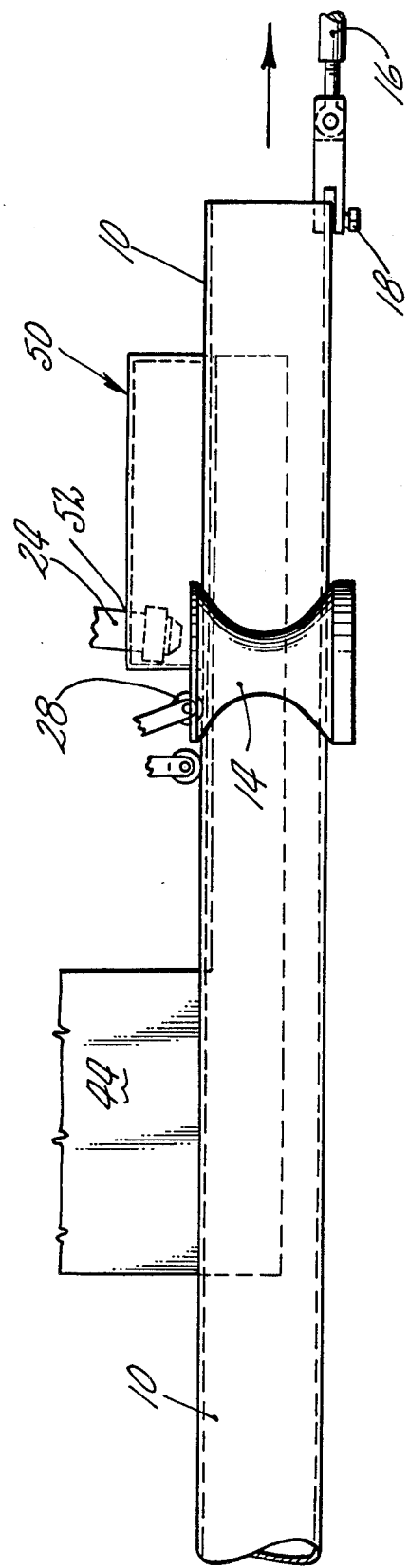
FIG. 2 is a side view of FIG. 1.

Referring first to FIGS. 1–4, parts of the capstan type welding mill are shown in which the titanium tube preforms are closed and drawn under a relatively stationary plasma arc welding torch, only those parts of the mill being shown that are necessary for an understanding of the invention. The welding mill includes a long bed 8, which supports at one of its ends the structure shown in FIGS. 1–4 for making a longitudinal seam weld in a titanium preform 10. The preform is drawn through a plurality of confronting pairs of capstan rollers, one of which sets is shown at 12 and 14 in FIGS. 1 and 2. The preform is advanced by means 16 which is clamped to the preform at point 18 diametrically opposite the confronting edges 20 of the latter which are to be joined by welding. As is usual in these mills the rollers of each set are laterally adjustable toward and away from each other so as to progressively close gap 22 at the confronting edges of the preform as torch 24 is approached. Capstan rollers 12 and 14 shown in FIGS. 1 and 2 are called the welding capstan since they are located adjacent torch 24 and these are adjusted to narrow the gap between confronting edges 20 of the preform until the gap is almost, but not quite, closed.

Plasma arc torch 24 is a well-known type having an enclosed, non-consumable tungsten electrode from which the arc is transferred through an orifice to the work piece and in which the arc is surrounded by an inert welding and shielding atmosphere, usually argon gas. Additional filler material is not used in this mill.

Upstream of the welding torch is an electromechanical seam tracker 26 having a knife-edge wheel 28 which runs in the almost-closed seam. Tracker 26 inputs lateral torch movement as required to keep the torch and the resulting weld bead directly on the seam. The torch is mounted on a compound slide to permit this lateral movement relative to the seam as well as vertical movement of the torch toward and away from the weld seam. The plasma arc torch 24 and the seam tracker 26 are supported on fixed frame structure 30 of the tube mill which in turn is supported by the bed of the mill on sets of spaced upright frame members 32 (FIG. 4) two sets of which are shown in FIG. 3. Frame structure 30 also supports a knife-edge guide bar 40 and a hold-down seam roller 42.

Depending from frame structure 30 is a vertical plate 44 which extends through slot 22 and carries at its lower edge a mandrel 46 which extends within the tubular preform 10 to a point well down-stream of the torch location. Mandrel 46 is U-shaped in cross section and is secured to the lower edge of plate 44 by a weldment 48. Mandrel 46 has a reaction roller 49 (FIG. 5) opposite seam roller 42 which is journalled between the parallel side walls of mandrel 46.

In order to meet the stringent requirements for welding titanium for main rotor blade spars it is necessary to shield the molten weld with improved top and bottom gas confining trailers that ride on the moving tube preform, since oxygen in the area of welding is restricted to a maximum of 50 parts per million during welding and 20 parts per million before welding. Existing gas trailers were unable to meet these requirements, particularly the bottom trailer. These requirements were particularly difficult to meet in the welding of tapered spars for helicopter rotor blades in which the inside diameter is held constant and the taper, which is non-uniform, is obtained by tapering the outside diameter of the spar. This results in a spar in which the wall thickness of the spar diminishes from its root end to its tip end. In a typical spar of 25′ in length this may amount to a reduction in diameter of the spar of ⅛′, resulting in a corresponding reduction in wall thickness.

The upper gas trailer generally indicated at 50 comprises a rectangular box-like structure having an opening 52 through which torch 24 extends. Trailer 50 is positioned over the preform 10 by longitudinally spaced, vertically adjustable hangers 54, 56 (FIG. 3) which depend from a beam 58 and can be individually adjusted relative to beam 58 by turning nuts 60 in fixtures 62 on the underside of beam 58. The lower ends of hangers 54, 56 are pivotally supported on transverse pins 64 in fixtures 65 on trailer 50. This permits the trailer 50 to be adjusted in longitudinal vertical planes including the preform 10 to closely engage the tapered outer surface of a tapered spar.

Figure 11:
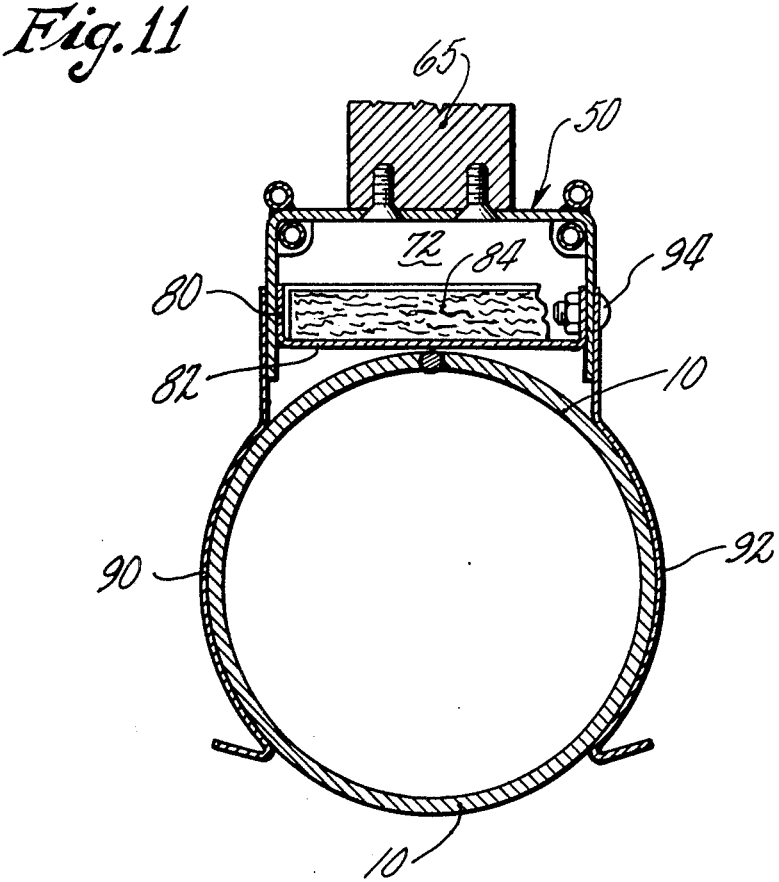
FIG. 11 is a section on line 11—11 of FIG. 10.

Argon gas is supplied to torch 24 by a pipe 66 (FIG. 9) and to trailer 50 by pipes 68, 70 from which the gas is discharged into chamber 72 (FIG. 11). Cooling water is also supplied through pipes 74, 76 (FIG. 10) through the trailer and around the welding torch therewithin.

Trailer 50 has a tray 80 provided with a foraminous bottom 82 approximately midway of its side walls which contains a body of stainless steel wool 84. A front end wall 86 and a rear end wall 88 are provided for the upper trailer which conform to the arcuate surface of the preform 10.

In order to seal the sides and the ends of the upper trailer two resilient skirts 90, 92 are provided which are connected to trailer 50 along their upper edges by fasteners 94 and which extend downward around the circumference of the preform, well below the horizontal diameter of the same, and by their resilience hug the preform surfaces maintaining a good seal throughout the length of the trailer even though the external diameter of the preform varies considerably from its leading to its trailing edge. The ends of skirts 90, 92 adjacent torch 24 are shaped to conform to capstan rollers 12, 14 and are held in position against the capstan rollers. It will be noted in FIG. 10 the front end wall 86 of trailer 50 meets the tops of capstan rollers 12, 14.

The lower gas containing trailer, generally indicated at 98 in FIGS. 6 and 7, consists of a box-like structure which is located within preform 10 beneath the upper gas trailer 50. Trailer 98 is supported at its two ends on mandrel 46 by springs 100 carried by vertical pins 102 fixed at their lower ends in mandrel 46. The trailer has end walls 104, 106 which carry angle irons 108, 110 provided with holes to receive pins 102 so that the horizontal legs of angle irons 108, 110 rest upon springs 100. End walls 104, 106 have raised transverse arcuate surfaces 112 which conform to the inside curved surface of the preform and provide a support for end seals 113 for chamber 114 of the trailer. The top of chamber 114 is provided with a perforated plate 116 overlying a screen 118, both of which have openings for a heat sink 120 located directly below the welding electrode. The lower end of the heat sink within chamber 114 is surrounded by a cooling coil 122 through which water is circulated. The bottom wall 123 of trailer 98 is lower in the vicinity of the heat sink but is offset upwardly downstream of the welding electrode to provide a space 124 for a plurality of compression springs 126 arranged longitudinally in the trailer. Argon gas is maintained in chamber 114 and the space above the perforated plate 116 by means of pipes 130 (FIG. 6). Forward of the welding electrode reaction roller 49 is mounted in mandrel 46 directly below the hold-down roller 42. The side edges of trailer 98 are provided with resilient sealing strips 132 (FIG. 8) which together with sealing means 113 provide a continuous seal around the upper edges of this lower trailer.

In the operation of this welding mill the preform 10 is drawn slowly through the capstan rollers to gradually reduce the gap between the confronting edges to be joined by welding. When the leading edge of the preform reaches the welding capstan rollers 12, 14 the gap is reduced to the exact width of the keyhole weld desired and is directly beneath the welding electrode and within the argon atmosphere in chamber 72 of the upper trailer and chamber 114 of the lower trailer. The welding torch is tracked into position by tracking roller 28. The welding torch supplies argon gas about the welding electrode and the copper heat sink 120 beneath the weld seam provides temperature control of the weld bead within the welded tube.

The argon atmosphere within the upper gas trailer is held within the strict limits for welding titanium even if the spar being welded is tapered since the trailer can be adjusted in longitudinal vertical planes by varying the length of hanger bolts 54, 56 and the hugging action of the resilient skirts 92 about the converging side walls of the preform causes the skirts to cling to the preform throughout the length of the gas containing trailer.

The lower gas trailer is constantly urged upward by springs 126 and also by springs 100 located at the ends of the trailer. The trailer floats on these springs so that it can adjust to the inner surface of the preform by movement in longitudinal vertical planes.

Figure 12:
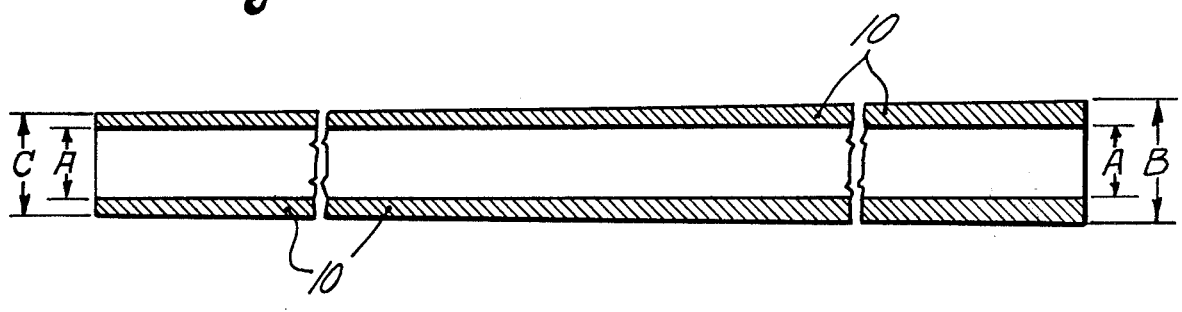
FIG. 12 is a longitudinal sectional view of a tapered blade spar, parts being broken away to facilitate illustration.

A typical tapered spar is shown in FIG. 12 in which the external root diameter is indicated at B and the external tip diameter is indicated at C. The internal diameter, which is uniform throughout the length of the spar, is indicated at A. This results in a reduction in wall thickness from root to tip end of the blade which requires either a reduction in speed at which the preform is drawn through the mill or a reduction in current supplied to the welding torch. This is accomplished automatically by mechanism well known in the welding art.

While we have described our invention in its preferred form in considerable detail, we do not want to be limited to the exact form shown and described since many changes will be obvious to those skilled in the welding art which fall within the scope of the following claims.

We claim:

1. In a plasma arc welding machine for making longitudinal welds in titanium blade spars comprising a supporting bed, sets of capstan rollers on said bed for progressively narrowing the gap between confronting edges of a tubular preform to be welded as said preform is drawn through said rollers, a frame on said machine above said preform, a plasma arc torch mounted on said frame above the gap in said preform, a vertical plate extended through said gap into said preform, a mandrel carried by said plate and extended to a point downstream of said torch, a lower gas containing trailer mounted on said mandrel beneath the gap in said preform, said trailer comprising an elongated box-like member open at the top, resilient members upstanding from the longer sides of said trailer in position to engage the underside of said preform on opposite sides of said gap, arcuate closure members on the ends of said trailer adapted to engage the inside of said preform upstream and downstream of said torch, and resilient means on said mandrel for supporting said trailer for bodily movement in vertical planes including said preform.

2. The combination recited in claim 1 in which the resilient means includes outstanding flanges on the end walls of said trailer, pins carried by said mandrel extending through holes in said flanges and compression springs on said pins between the mandrel and said flanges.

3. The combination recited in claim 1 in which a heat sink is located in the trailer at one end beneath the plasma arc torch and the bottom of the trailer is adapted to receive a plurality of compression springs between the mandrel and the bottom of said trailer.

* * * * *

UNITED STATES PATENT AND TRADEMARK OFFICE
CERTIFICATE OF CORRECTION

PATENT NO. : 4,153,831
DATED : May 8, 1979
INVENTOR(S) : Michael A. Renzulli et al It is certified that error appears in the above-identified patent and that said Letters Patent are hereby corrected as shown below:

Column 4, Line 8 " ½' " should be " ½" "

Signed and Sealed this

Fourth Day of December 1979

[SEAL]

Attest:

SIDNEY A. DIAMOND

Attesting Officer

Commissioner of Patents and Trademarks